US010572543B2

(12) United States Patent
Jussila et al.

(10) Patent No.: US 10,572,543 B2
(45) Date of Patent: Feb. 25, 2020

(54) METHOD AND SYSTEM FOR PROVIDING INFORMATION

(71) Applicant: Playmore Games Oy, Helsinki (FI)

(72) Inventors: Jouni Jussila, Savikylä (FI); Tomi Vainikka, Järvenpää (FI)

(73) Assignee: PLAYMOREGAMES OY, Helsinki (FI)

( * ) Notice: Subject to any disclaimer, the term of this patent is extended or adjusted under 35 U.S.C. 154(b) by 298 days.

(21) Appl. No.: 15/795,613

(22) Filed: Oct. 27, 2017

(65) Prior Publication Data

US 2019/0130049 A1 May 2, 2019

(51) Int. Cl.
*G06F 16/90* (2019.01)
*G06F 16/903* (2019.01)
*G06F 16/9035* (2019.01)

(52) U.S. Cl.
CPC .... *G06F 16/90335* (2019.01); *G06F 16/9035* (2019.01)

(58) Field of Classification Search
CPC .............. G06F 16/90335; G06F 16/9035
See application file for complete search history.

(56) References Cited

U.S. PATENT DOCUMENTS 9,336,268 B1 * 5/2016 Moudy ............... G06F 16/244
2015/0262512 A1 * 9/2015 Rios ..................... G09B 23/28
434/262

* cited by examiner

*Primary Examiner* — Loc Tran
(74) *Attorney, Agent, or Firm* — Ziegler IP Law Group (57) ABSTRACT

A method and a system for dynamically modifying a flow of information. The method includes presenting a first set of information to members of a first group, a member being presented the first set of information using an initial information flow type selected from a plurality of different information flow types; collecting feedback related to the presented first set of information from the members; determining fit scores for the members based upon the collected feedback; and associating the members with information flow types selected from the plurality of different information flow types, corresponding to the determined fit scores of the members.

18 Claims, 5 Drawing Sheets

| Persons | Flow type | Fit score | Associated flow |
|---|---|---|---|
| 1 | 1 | 30 | 2 or 3 randomly |
| 2 | 1 | 60 | 2 or 3 randomly |
| 3 | 2 | 75 | 2 |
| 4 | 3 | 100 | 3 |
| 5 | 3 | 40 | 1 or 2 randomly |
| 6 | 2 | 80 | 2 |
| 7 | 3 | 90 | 3 |
| 9 | 2 | 30 | 1 or 2 randomly |
| 10 | 1 | 95 | 1 |

METHOD AND SYSTEM FOR PROVIDING INFORMATION

TECHNICAL FIELD

The present disclosure relates generally to information technology; and more specifically, methods for dynamically modifying a flow of information, via a system comprising a plurality of first devices associated with members of a first group, a database, and a computing device. Furthermore, the present disclosure also relates to systems for dynamically modifying the flow of information, using the aforementioned methods.

BACKGROUND

Generally, a person tends to take up hundreds of tasks in a single day like cooking, reading, playing games, assembling a machine and so forth. In few instances, the person may need some help in the form of information to successfully perform and complete such tasks. Typically, such additional information may be provided in the form of tutorials (or manuals). Furthermore, such tutorials may be provided digitally (including text, images, audios, videos and so forth), or in the form of a booklet or a brochure. Moreover, such information (associated with the tutorials) may be provided to a person on a digital device, such as mobile, tablet, or laptop, associated with the person.

The aforementioned ways of providing information may be associated with numerous problems. For example, tutorials generally include too much of extra (or irrelevant) information making it inconvenient for a person to quickly fetch or identify required information for carrying out any task. Furthermore, such tutorials include standard information, i.e. standard text, images, audios, videos and so forth, and such standard information is presented in a standard format or sequence. Specifically, irrespective of requirement every person is presented with the same information. In such an instance, the process of identifying the required information becomes time consuming and cumbersome.

Therefore, in light of the foregoing discussion, there exists a need to overcome the aforementioned drawbacks associated with providing information to persons.

SUMMARY

The present disclosure seeks to provide a method for dynamically modifying a flow of information. The present disclosure also seeks to provide a system for dynamically modifying a flow of information. The present disclosure seeks to provide a solution to the existing problem of sub-optimal and irrelevant provision of information to persons. An aim of the present disclosure is to provide a solution that overcomes at least partially the problems encountered in the prior art, and provides an efficient, robust, seamless, easy to implement, and dynamically modifiable solution for the provision of information to persons.

In one aspect, an embodiment of the present disclosure provides a method for dynamically modifying a flow of information, via a system comprising a plurality of first devices associated with members of a first group, a database, and a computing device, the method being implemented by the computing device, the method comprising:
   presenting a first set of information to the members of a first group, wherein a member is presented the first set of information using an initial information flow type selected from a plurality of different information flow types;
   collecting feedback related to the presented first set of information from the members;
   determining fit scores for the members based upon the collected feedback; and
   associating the members with information flow types selected from the plurality of different information flow types corresponding to the determined fit scores of the members.

In another aspect, an embodiment of the present disclosure provides a system for dynamically modifying a flow of information, the system comprising:
   a plurality of first devices associated with members of a first group;
   a database configured to store at least a first set of information; and
   a computing device communicably coupled to the plurality of first devices and the database, wherein the computing device is configured to:
      present the first set of information to the members of the first group, wherein a member is presented the first set of information using an initial information flow type selected from a plurality of different information flow types;
      collect feedback related to the presented first set of information from the members;
      determine fit scores for the members of the first group, based upon the collected feedback; and
      associate the members of the first group with an information flow type selected from the plurality of different information flow types, corresponding to the determined fit scores of the members.

Embodiments of the present disclosure substantially eliminate or at least partially address the aforementioned problems in the prior art, and enables information to be provided to persons in a systematic, efficient, robust, seamless, and dynamically modifiable manner.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a method for dynamically modifying a flow of information, via a system comprising a plurality of first devices associated with members of a first group, a database, and a computing device, the method being implemented by the computing device, the method comprising:
  presenting a first set of information to the members of a first group, wherein a member is presented the first set of information using an initial information flow type selected from a plurality of different information flow types;
  collecting feedback related to the presented first set of information from the members;
  determining fit scores for the members based upon the collected feedback; and
  associating the members with information flow types selected from the plurality of different information flow types corresponding to the determined fit scores of the members.

In another aspect, an embodiment of the present disclosure provides a system for dynamically modifying a flow of information, the system comprising:
  a plurality of first devices associated with members of a first group;
  a database configured to store at least a first set of information; and
  a computing device communicably coupled to the plurality of first devices and the database, wherein the computing device is configured to:
    present the first set of information to the members of the first group, wherein a member is presented the first set of information using an initial information flow type selected from a plurality of different information flow types;
    collect feedback related to the presented first set of information from the members;
    determine fit scores for the members of the first group, based upon the collected feedback; and
    associate the members of the first group with an information flow type selected from the plurality of different information flow types, corresponding to the determined fit scores of the members.

The present disclosure provides the aforementioned method for dynamically modifying the flow of information and the aforementioned system for dynamically modifying the flow of information. The described method allows for providing person-specific (namely, customizable) relevant flow of information. Consequently, the members are provided with an optimal information content that is presented in an optimal manner that best suits the members' requirements. Furthermore the method also allows for dynamically modifying the flow of information presented to the member, over time, and as per requirement, by way of collecting continuous feedback from the members. Beneficially, the method is easy to implement, robust, reliable, and highly interactive. Furthermore, the system described herein is simple and inexpensive.

Throughout the present disclosure, the term "information" used herein relates to meaningful data (namely, facts and/or figures) pertaining to a task and/or an entity. Furthermore, the information could be in form of text, image, audio, video, or any combination thereof.

Optionally, the information pertaining to the task comprises at least one of: a description of the task, a tutorial for executing the task, things to keep in mind while executing the task, post-execution details pertaining to the task. In one example, the information may be a video tutorial detailing a sequence of steps to be implemented for cooking an appetizer. In another example, the information may be a description of a game and directions for calculating a player's score upon completion of the game.

Furthermore, optionally, the information pertaining to the entity comprises at least one of: a description of the entity, rules and/or regulations pertaining to the entity, attributes of the entity. In one example, the information may be a video describing components of an electric vehicle and rules for safely operating the electrical vehicle. In another example, the information may be a description of achievements of a sportsperson, and physical attributes (for example, such as height, weight, and so forth) of the sportsperson.

Furthermore, throughout the present disclosure, the term "flow of information" relates to a manner in which the information is provided to a person involved with the task and/or the entity. Notably, the flow of information defines which, what, and how the information is to be provided to the person. In an example, the information may be provided part-wise, in a sequential, highly detailed manner. In another example, all the information may be provided at once, in a concise manner.

It will be appreciated that different persons may require different flows of information, in order to comprehend and utilise the information productively. Furthermore, a same person may require different flows of information at different instances, based upon his/her requirement.

As mentioned previously, the first set of information is presented to the members of the first group , wherein a member is presented the first set of information using an initial information flow type selected from a plurality of different information flow types. Notably, the first set of information is presented by the computing device, at the plurality of first devices associated with the members of the first group. Optionally, the first set of information is presented at user interfaces of the plurality of first devices.

Throughout the present disclosure, the term "first set of information" relates to at least a part of the information. As an example, if the information comprises a tutorial for playing a game (for example, such as monopoly) and directions for calculating scores of players upon completion of the game, the first set of information may be the tutorial for playing the game. Furthermore, throughout the present disclosure, the term "members of the first group" relates to persons that are associated with the task and/or the entity, and are therefore provided at least a part of the information.

Furthermore, optionally, the first set of information is arranged as a plurality of information blocks, and wherein the plurality of information blocks are further arranged as at least one information layer. Optionally, in this regard, the aforesaid arrangement may be made based upon pre-acquired metadata of the first set of information and/or a taxonomy of the first set of information. Throughout the present disclosure, the term "information block" relates to a data structure comprising at least a part of the information. Furthermore, the term "information layer" relates to a data structure comprising at least one information block. Therefore, it will be appreciated that the at least one information layer includes at least one information block.

As an example, the first set of information may be arranged as seven constituent information blocks wherein the seven information blocks may be further arranged as three information layers L1, L2 and L3. In such an example, the information layer L1 may comprise four information blocks, the information layer L2 may comprise two information blocks, and the information layer L3 may comprise one information block.

In one example the first set of information can be an animated tutorial having set of information blocks. Content of the information blocks can be rendered as three dimension (3D) animations on a user interface of a device that a person or group of persons are using.

As another example, the first set of information may be arranged as one information layer L, wherein the information layer L may comprise all the seven information blocks.

Moreover, throughout the present disclosure, the term "plurality of different information flow types" relates to distinct manners of presenting at least a part of the information. Specifically, by using initial information flow types selected from the plurality of information flow types, at least the first set of information may be presented in different ways and/or parts, to the members of the first group. It will be appreciated that same or different initial information flow types may be selected to present the first set of information to different members of the first group. Optionally, the plurality of different information flow types are used to present different information blocks to different members of the first group. Furthermore optionally, the different information blocks may be presented by presenting different information layers to different members of the first group.

In an example, the first set of information may be arranged as 4 information blocks arranged in two layers LYR1 and LYR2 wherein each layer includes 2 information blocks. In such an instance, an initial information flow type 1 may be used to present 2 information blocks of only LYR1 to the members of the first group whereas an initial information flow type 2 may be used to present the 4 information blocks of both the LYR1 and LYR2 to the members of the first group.

Optionally, the plurality of different information flow types are based upon at least one of: a nature of the first set of information, profiles of the members of the first group, preferences of the members of the first group. Notably, a number and/or characteristics of the plurality of different information flow types are based upon the aforesaid criteria. As an example, a number of the plurality of different information flow types may be based upon the nature of the first set of information. In such an instance, the nature of the first set of information relates to a data type of the first set of information, an amount of the first set of information, and so forth. Therefore, if the first set of information is very concise, a number of information flow types that could be used to present such a first set of information, may be less. Alternatively, if the first set of information is very discursive, a number of information flow types that could be used to present such a first set of information, may be more.

Furthermore, optionally, the initial information flow types are selected based upon at least one of: the nature of the first set of information, the profiles of the members of the first group, the preferences of the members of the first group, random selection, probabilistic selection. Notably, selection of the initial information flow types among the plurality of different information flow types is based upon the aforesaid criteria.

In an example, the initial information flow types may be selected based upon the profiles of the members of the first group. In such an instance, the profiles of the members of the first group may indicate a level of expertise of the members with regard to the task associated with the first set of information. Therefore, expertise-specific information flow types may be used for presenting the first set of information. For example, an information flow type for presenting a detailed flow of the first set of information is selected to be used for a novice member whereas another information flow type for presenting a brief flow of the first set of information is selected to be used for an expert member.

In another example, the initial information flow types may be selected based upon the preferences of the members of the first group. In such an instance, choices of different members with regard to the nature of the first set of information that they wish to be presented, may be taken into account efficiently. Furthermore, such preferences may be pre-set by the members of the first group. Therefore, the information flow type for presenting the brief flow of the first set of information is selected to be used for a member who wishes to view less information whereas the flow type for presenting the detailed flow of the first set of information is selected to be used for another member who wishes to view comprehensive information.

In another example, the initial information flow types may be selected based upon the random selection. In such an instance, random selection may be employed to present the first set of information to the members of the first group. For example, among four different information flow types FLOW 1, FLOW 2, FLOW 3, and FLOW 4, the information flow types FLOW 1 and FLOW 4 may be randomly selected to be used for presenting the first set of information to two members 'MEMBER 1' and 'MEMBER 2' respectively, of the first group.

In yet another example, the initial information flow types may be selected based upon the probabilistic selection. In such an instance, a probability of suitability of using a given initial information flow type among the plurality of different information, for a given member of the first group, may be pre-determined. For example, among the aforesaid four different information flow types FLOW 1-4, the information flow type FLOW 2 may be probabilistically selected to be used for presenting the first set of information to another member 'MEMBER 3' of the first group, based upon a previously conducted survey wherein 70 percent people of same age group as the MEMBER 3, preferred to be presented the first set of information using the information flow type FLOW 2.

As mentioned previously, feedback related to the presented first set of information is collected from the members of the first group. In such an instance, the term "feedback" relates to response of the members of the first group to the first set of information presented by using the plurality of different information flow types. Optionally, the members of the first group provide the aforesaid feedback by way of the plurality of first devices. Such feedback is subsequently communicated from the plurality of first devices to the computing device.

Optionally, the feedback is collected during one or more of presenting the first set of information and after presenting the first set of information. Beneficially, the collection of the feedback whilst presenting the first set of information to the members of the first group enables real-time dynamic modification of the flow of information. Furthermore, the collection of the feedback after presenting the first set of information is easy to implement, does not interfere with a member's experience of receiving the first set of information, and allows for the members of the first group of information to provide an informed feedback after receiving the entire first set of information.

Optionally, the feedback is collected by way of at least one of: obtaining ratings from the members of the first group, obtaining sensor data associated with the members of the first group. In such an instance, the ratings allow for directly quantifying the feedback of the members of the first group, whereas the sensor data is processed to quantify the feedback of the members of the first group.

Furthermore, optionally, the ratings are obtained from the members of the first group on a predetermined scale, for example, such as on a scale of 1 to 10. Optionally, the members of the first group provide the ratings at the user interfaces of the plurality of first devices by way of at least one of: a touch input, a voice input, an image input, a video input. In an example, the members of the first group may rate a video tutorial for cooking coconut curry (the first set of information). In such an example, a member Z1 may rate the video tutorial as 3 on a scale of 1 to 10, whereas another member Z2 may rate the video tutorial as 8 on the scale of 1 to 10. The members Z1 and Z2 may prove the aforesaid ratings by entering (for example, by pressing) the numbers '3' and '8' respectively, on alphanumeric keyboards rendered on user interfaces of touch-sensitive first devices associated therewith.

Optionally, the sensor data includes at least one of: inputs of the members of the first group, timestamps associated with the inputs of the members of the first group, one or more of image and video captured by the members of the first group, audio captured by the members of the first group. In such an instance, the sensor data is obtained by employing sensors (for example, such as touch sensor, audio sensor, and so forth) of the plurality of first devices associated with the members of the first group. Such sensors are optionally integrated within the plurality of first devices.

In an exemplary implementation, the first set of information presented to the members of the first group may be an interactive tutorial for playing a game of chess. In such a case, the feedback may be collected by way of sensor data associated with the members of the first group, wherein the sensor data is obtained by employing touch sensors, audio sensors, and imaging sensors of the plurality of first devices. Furthermore, in such an example, the interactive tutorial may be rendered on the user interfaces of the plurality of first devices wherein the interactive tutorial may include user-selectable 'previous', 'next', and 'more information' buttons (or icons) for re-viewing previously presented information, viewing following information, and viewing more elaborate information of a currently presented feature, respectively. Therefore, the members of the first group may select (for example, by touch) any of the user-selectable buttons to provide input to the plurality of first devices.

In a first example, a member may often select the 'more information' button, thereby, indicating that the member prefers a detailed information flow type for receiving the first set of information. Therefore, in such a case, the sensor data includes the 'more information' input of the member.

In a second example, the member may select the 'next' button very fast, thereby indicating that he/she does not that type of information. Therefore, in such a case, the sensor data includes timestamps associated with selection of the 'next' button, wherein the timestamps are employed to indicate how fast the member provides his/her input. Furthermore, in such an example, if according to the aforesaid timestamps, the member seems to accelerate pace of the interactive tutorial by pressing the 'next' button quickly after a certain aspect (for example, such as chess board setup) of the interactive tutorial has been discussed, it indicates that the member prefers an information flow type that focuses on the certain aspect of the first set of information.

In a third example, the interactive tutorial may prompt the member to capture an image IMG 1 of the chess board upon presenting setup instructions to the person. In such a case, the sensor data includes the image IMG 1 captured by an imaging sensor of a first device associated with the member. Furthermore, if the captured image IMG 1 depicts that an arrangement of the chess board (namely, placement of chess pieces) is correct, it indicates that the member has understood the presented setup instructions correctly. Alternatively, if the captured image depicts IMG 1 that the arrangement of the chess board is incorrect, it indicates that the member has not understood the presented setup instructions correctly. Furthermore, the member may also capture an image IMG 2 of the chessboard at any stage of the game to automatically calculate his/her score based upon the placement of the chess pieces at that stage. For example, the IMG 2, constituting at least a part of the sensor data, may be captured at the end of the game to calculate a score of the member.

In a fourth example, the member may capture an audio whilst playing the game of chess. In such a case, the sensor data includes the audio captured by an audio sensor of the first device associated with the member. Therefore, the audio may be used to check if a number of moves associated with a chess piece is correct or incorrect. For example, a knight can move only 3 places in one move. However, if a member moves a knight incorrectly, for example, 5 places in one move, the audio can be used to identify such an incorrect move.

As mentioned previously, the fit scores for the members of the first group is determined, based upon the collected feedback. It will be appreciated that a fit score is determined for each member of the first group. Notably, the "fit score" is a measure of suitability (namely, appropriateness) of an information flow type that is used to present the first set of information to a given member. Therefore, it will be appreciated that a high fit score for a member of the first group indicates that the used information flow type for that member presents the first set of information in a manner that is appropriate for him/her, whereas a low fit score for the member indicates that the used information flow type for that member presents the first set of information in a manner that is inappropriate for him/her.

In an example, if an information flow type for presenting a brief tutorial for assembling wooden furniture is used for an expert carpenter, an apprentice carpenter, and an amateur, a fit score 'S1' for the expert carpenter may be high (for example, such as 8 out of 10), a fit score 'S2' for the apprentice carpenter may be lower than the fit score S1 (for example, such as 6 out of 10), and a fit score 'S3' for the amateur may be even lower than the fit score S2 (for example, such as 3 out of 10).

Optionally, the fit score is determined by way of: comparing expected feedback from the members of the first group with the collected feedback from the members of the first group. In such an instance, upon comparison, if the collected feedback from the members of the first group is in sync with (namely, approximate to) the expected feedback from the members of the first group, the fit score is high. Alternatively, if the collected feedback from the members of the first group is not in sync with (namely, is highly deviated from) the expected feedback from the members of the first group, the fit score is low.

As an example, the first set of information presented to the members of the first group may be a video tutorial for baking a cake. In such an instance, the feedback may be collected after presenting the first set of information, wherein the feedback is collected by way of obtaining sensor data associated with the members of the first group. Furthermore, the sensor data may include an image X and a video Y captured by the members of the first group, using imaging sensors of the plurality of first devices associated therewith, whilst baking the cake. In an exemplary scenario, all the members of the first group may capture the image X of cake batter and the video Y of the cake after baking the cake batter for 30 minutes at 180 degree Celsius, using an oven. In such a scenario, an expected feedback may be that consistency of the cake batter should be smooth and the cake batter should be thick. Furthermore, the expected feedback may be that when a toothpick is inserted in the centre of the cake, the toothpick should come out clean. Therefore, the fit score for a member of the first group would be high (for example, such as 90% fit, or a score of 90 on a scale of 1 to 100) if the captured image X depicts a smooth, thick cake batter and the captured video Y depicts that the inserted toothpick comes out clean. Furthermore, the fit score for the member of the first group would be low (for example, such as 30% fit, or a score of 30 on a scale of 1 to 100) if the captured image X depicts a lumpy, thick cake batter and the captured video Y depicts that the inserted toothpick comes out dirty.

Furthermore, the members of the first group are associated with information flow types selected from the plurality of different information flow types corresponding to the determined fit scores. Notably, such association relates to assigning each member of the first group with a corresponding information flow type, in a manner that any subsequent set of information is provided to the each member using the assigned information flow type thereof.

Optionally, (i) the member of the first group is associated with the information flow type used for presenting the first set of information to the member, if the determined fit score for the member is above a pre-determined threshold level, or (ii) the member of the first group is associated with an information flow type different from the information flow type used for presenting the first set of information to the member, if the determined fit score for the member is below the pre-determined threshold level. Therefore, in such an instance, the fit score for the member being above the pre-determined threshold level, indicates a high degree of suitability of the used initial information flow type for that member, and therefore the same used initial information flow type is assigned to the member. However, the fit score for the member being below the pre-determined threshold level, indicates a low degree of suitability of the used initial information flow type for that member, and therefore a different information flow type is assigned to the member.

As an example, the first set of information may be presented to 3 members K1, K2, and K3 of a first group using initial information flow types J1, J1, and J2 respectively. In such an example, the pre-determined threshold level may be 70% fit, or a score of 70 on a scale of 1 to 100. Therefore, if the fit scores for the members K1, K2, and K3 are 30% fit, 90% fit, and 75% fit respectively, the members K1, K2, and K3 are assigned information flow types 32, 31, and 32 respectively. Notably, the fit score for the member K1 is below the pre-determined threshold level, and therefore, the member K2 is associated with the information flow type 32 that is different from the initial information flow type 31 used for presenting the first set of information to the member K1. Furthermore, since the fit scores for the members K2 and K3 are above the pre-determined threshold level, the members K2 and K3 are associated with their initial information flow types J1 and J2 respectively.

Furthermore, optionally, the pre-determined threshold level is fixed. In such an instance, a magnitude of the pre-determined threshold level could be set by a system administrator associated with the aforesaid system. For example, the system administrator associated with the computing device of the system may fix the pre-determined threshold level at 60% fit. Alternatively, optionally, the pre-determined threshold level is variable. In such an instance, the magnitude of the pre-determined threshold level could be dynamically set by the system administrator associated with the aforesaid system.

For illustration purposes only, there will now be considered an example wherein the first group may comprise 4 members (namely, 4 persons) P1, P2, P3, and P4 that are players associated with a board game G (for example, such as Monopoly®). In such an example, the first set of information to be presented to the first group P1-P4 may be a video tutorial for playing the board game G. Furthermore, in such an example, the first set of information is arranged as 9 information blocks in 3 layers A1, A2, and A3, wherein each layer comprises 3 information blocks. In such an instance, the 3 information blocks of the layer A1 may comprise game setup details for playing the board game G, the 3 information blocks of the layer A2 may comprise rules for playing the board game G, and the 3 information blocks of the layer A3 may comprise information regarding rewards/penalties within the board game G. Furthermore, the first set of information may be presented to the members of the first group P1-P4 using two different initial information flow types F1 and F2. In such an instance, the information flow type F1 presents the video tutorial in a stepwise, highly detailed manner by providing information of the layers A1, A2 and A3, whereas the information flow type F2 presents the video tutorial in a brief manner by providing information of the layers A1 and A2 only. For example, the members P1 and P2 may be randomly presented first set of information using the initial information flow type F1 and the members P3 and P4 may be randomly presented first set of information using the initial information flow type F2. Thereafter, feedback related to the presented first set of information is collected from the members of the first group P1-P4 after presenting the first set of information, by way of obtaining ratings from the members of the first group P1-P4. For example, the members P1, P2, P3, and P4 may rate the presented first set of information as 2, 8, 7, and 3 respectively, on a scale of 1 to 10. Thereafter fit scores FIT1, FIT2, FIT3, and FIT4 may be determined for the members P1, P2, P3, and P4 respectively, based upon the collected feedback. For example, the fit scores for the persons P1, P2 P3, and P4 may be 20%, 80%, 70%, and 30% respectively. Consequently, the members of the first group P1-P4 are associated with information flow types selected from the plurality of different information flow types F1 and F2, corresponding to the determined fit scores of the members. In such an instance, a fixed pre-determined threshold level (for example, such as 60%) may optionally be employed. Therefore, in such a case, if the fit score of a member is above the pre-determined threshold level, he/she is associated with the used initial information flow type used for presenting the first set of information to him/her, whereas if the fit score of the member is below the pre-determined threshold level, he/she is associated with another information flow type among the plurality of different information flow types. Therefore, in the aforesaid example, the members P1, P2, P3, and P4 may be associated with the information flow types F2, F1, F2, and F1, respectively. Notably, the members P1 and P4 are associated with information flow types different from the initial information flow types F1 and F2 respectively, that were used for presenting the first set of information thereto, since the determined fit scores for the members P1 and P4 were determined to be below the pre-determined threshold level. On the other hand, the members P2 and P3 are associated with the initial information flow types F1 and F2 used for presenting the first set of information thereto, since the determined fit scores for the members P2 and P3 are determined to be above the pre-determined threshold level.

Optionally, the method further comprises creating a first set of clusters, wherein a cluster in the first set of clusters includes members of the first group that have a common associated information flow type; and associating a common associated information flow type to the cluster. Optionally, in this regard, the first set of clusters comprises a plurality of clusters. Throughout the present disclosure, the term "cluster" used herein relates to a group comprising at least one member, wherein all members of the cluster are associated with the common information flow type. Therefore, the common associated information flow type associated with the members of the first group is the criterion based upon which such clustering is implemented. Furthermore, for each cluster in the first set of clusters, the common information flow type associated with all members thereof is associated with the cluster.

Optionally, the aforesaid clustering is implemented by way of at least one clustering algorithm. Examples of the at least one clustering algorithm include, but are not limited to, K-means clustering algorithm, a hierarchical clustering algorithm, a fuzzy clustering algorithm.

In an example, the first group may comprise 6 members R1, R2, R3, R4, R5, and R6, having associated information flow types T1, T1, T2, T3, T3, and T1 respectively. For example, the information flow type T1 may present information in an extremely crisp manner (namely, including only bare minimum details), the information flow type T2 may present the information in a brief manner, and the information flow type T3 may present the information in a highly detailed manner. Furthermore, in such an instance, the members of the first group may be clustered, based upon the common associated information flow types, to create a first set of clusters C1, C2, and C3. Notably, members of the first group having a common associated information flow type are grouped together into one cluster. In such an instance, for example, the cluster C1 may comprise the members R1, R2, and R6, the cluster C2 may comprise the member R3, and the cluster C3 may comprise the members R4 and R5. Thereafter, the common information flow type associated with all members of the cluster may be associated with the cluster. In such a case, the information flow type T1 may be associated with the cluster C1, the information flow type T2 may be associated with the cluster C2, and the information flow type T3 may be associated with the cluster C3.

Optionally, the method further comprises affiliating members of a second group to clusters of the first set of clusters, wherein a member of the second group is affiliated with a cluster of the first set of clusters based on a profile of the members of the second group, and associating the information flow type associated with the clusters of the first set of clusters, with the members of the second group affiliated thereto. Throughout the present disclosure, the term "members of the second group" relates to persons that are associated with the task and/or the entity, and are therefore provided at least a part of the information. It will be appreciated that the first group and the second group are different from each other. Furthermore, throughout the present disclosure, the term "profile" used herein relates to a description of a given member including details (for example, such as personal information, personal preferences, level of expertise, and so forth) associated with the given member. It will be appreciated that the profiles of the members of the second group beneficially allow for each of the members of the second group to be conceptually affiliated to the clusters of the first set of clusters. In other words, the profile of each member of the second group may be analysed to identify attributes thereof, and consequently, each member of the second group may be affiliated to (namely, associated to) a cluster that is most appropriately suited with regard to such attributes. Furthermore, in such an instance, each member of the second group is associated with the common information flow type associated with their corresponding affiliated cluster.

Optionally, the members of the second group are affiliated to the first set of clusters by employing the at least one clustering algorithm described hereinabove.

In an example, the second group may comprise 5 members R7, R8, R9, R10, and R11, each having a distinct profile corresponding thereto. The members of the second group R7-R11 may be affiliated to the first set of clusters C1-C3 (as mentioned in the previous example), based upon the profiles of each of the members of the second group R7-R11. For example, the profiles of the members R7 and R9 may indicate that they are professional chefs, and therefore, expert cooks. Therefore the members R7 and R9 may be affiliated to the cluster C1, and consequently associated with the information flow type T1. Furthermore, the profiles of the members R8 and R11 may indicate that they are apprentice chefs, and therefore, competent cooks. Therefore the members R8 and R11 may be affiliated to the cluster C2, and consequently associated with the information flow type T2.

Moreover, the profile of the member R10 may indicate that he/she is a novice cook. Therefore the member R10 may be affiliated to the cluster C3, and consequently associated with the information flow type T3.

Optionally, the method further comprises presenting a second set of information to the members of the second group using the information flow type associated therewith. Throughout the present disclosure, the term "second set of information" relates to at least a part of the information.

In an embodiment, the second set of information is same as the first set of information. In another embodiment, the second set of information is different from the first set of information.

Optionally, the second set of information is arranged as a plurality of information blocks, and wherein the plurality of information blocks are further arranged as at least one information layer. Furthermore, optionally, the plurality of different information flow types are based upon a nature of the second set of information.

In an example, the second set of information may comprise directions for making macarons. Furthermore, such a second set of information may be presented to the members of the second group R7-R11 (as mentioned in the previous example). Therefore, in such a case, only a list of ingredients and basic steps for making the macarons may be presented to the members R7 and R9, since they are associated with the information flow type T1 (described in a previous example). Furthermore, the list of ingredients with their quantities, and brief steps for making the macarons may be presented to the members R8 and R11, since they are associated with the information flow type T2 (described in a previous example). Moreover, the list of ingredients with their quantities, detailed steps for making the macarons, and reference images of some steps may be presented to the member R10, since he/she is associated with the information flow type T3 (described in a previous example).

Optionally, the method further comprises collecting feedback related to the presented second set of information from the members of the second group; determining fit scores for the members of the second group based upon the collected feedback; associating the members of the second group with an information type selected from the plurality of different information flow types corresponding to the determined fit scores of the members; and re-affiliating at least one member of the second group to a cluster of the first set of clusters based upon the information flow type associated with the determined fit score of the at least one member of the second group. It will be appreciated that the aforesaid operations allow for optimizing clustering of the members of the second group, and consequently, the information flow type associated with the members of the second group so as to optimally modify the flow of information for the members of the second group. Furthermore, it will be appreciated that the re-affiliation is implemented only for those members of the second group, that are associated with a sub-optimal cluster, and consequently, with a sub-optimal information flow type.

Optionally, the re-affiliation of the at least one member of the second group is implemented by way of at least one of: the at least one clustering algorithm, neural network algorithms, round-robin method.

In an example, feedback may be collected from the second group R7-R11 (as mentioned in the previous example), and fit scores may be determined for each member of the second group R7-R11, based upon the collected feedback. For example, the fit scores for the members R7, R8, R9, R10, and R11 are 9 out of 10, 4 out of 10, 7 out of 10, 9 out of 10, and 8 out of 10 respectively. Therefore, the members R7, R9, R10, and R11 may be associated with the information flow types T1, T1, T3 and T2 respectively. However, the fit score for the member R8 indicates that the information flow type T2 is less than optimal therefor, and consequently, the member R8 could be re-affiliated to the cluster C3 (described in a previous example) and associated with the flow type T3. Consequently a second set of clusters is created wherein the cluster C1 may comprise the members R1, R2, R6, R7 and R9, the cluster C2 may comprise the members R3, and R11, and the cluster C3 may comprise the members R4, R5, R8 and R10.

Optionally, the method further comprises dynamically adjusting the information flow type associated with the first group and/or the second group, based upon at least one of: the nature of the first and/or the second set of information, the level of expertise of the members of the first group and/or the members of the second group.

In an example, an information flow type D1 may be associated with a given member when the information pertains to tutorials for playing games, whereas another information flow type D2 may be associated with the given member when the information pertains to operating an electrical appliance.

The system for dynamically modifying the flow of information comprises the plurality of first devices associated with members of the first group, the database configured to store at least the first set of information, and the computing device communicably coupled to the plurality of first devices and the database, wherein the computing device is configured to implement the method described hereinabove. It will be appreciated that the plurality of first devices could be implemented by way of hardware, software, firmware, or a combination of these, operable to assist the computing device in presenting at least the first set of information to members of the first group and collecting the feedback related to at least the presented first set of information, from the members of the first group. Notably, the first set of information could be presented on user interfaces of the plurality of first devices, and communication modules of the plurality of first devices could communicate the collected feedback to the computing device. Optionally, the first set of information could be presented at the plurality of first devices as at least one of: text, image, audio, video. The user interfaces of the plurality of first devices could be graphical user interfaces that allow for easy, engaging and efficient interaction between the members of the first group and the computing device. Examples of the plurality of first devices include, but are not limited to, smartphones, laptop computers, desktop computers, tablet computers, personal digital assistants.

Furthermore, optionally, the system further comprises a plurality of second devices associated with members of the second group, wherein the plurality of second devices are communicably coupled to the computing device. Optionally, in this regard, the plurality of second devices could be implemented by way of hardware, software, firmware, or a combination of these, operable to assist the computing device in presenting at least the second set of information to members of the second group and optionally collecting the feedback related to at least the presented second set of information, from the members of the second group. Notably, the second set of information could be presented on user interfaces of the plurality of second devices, and communication modules of the plurality of second devices could communicate the collected feedback to the computing device. Optionally, the second set of information could be presented at the plurality of second devices as at least one of: text, image, audio, video. The user interfaces of the plurality of second devices could be graphical user interfaces that allow for easy, engaging and efficient interaction between the members of the second group and the computing device. Examples of the plurality of second devices include, but are not limited to, smartphones, laptop computers, desktop computers, tablet computers, personal digital assistants.

Moreover, optionally, the database could be implemented by way of hardware, software, firmware, or a combination of these, operable to store at least the first set of information. Optionally, the database could also be operable to store the second set of information. Optionally, the database could be physically coupled to the computing device, for example, such as by way of wires. In such an instance, the database and the computing device are optionally arranged within same premises, for example, at a central control room of a building. Alternatively, optionally, the database is wirelessly coupled to the computing device. In such an instance, the database and the computing device are optionally remotely located with respect to each other.

Optionally, the computing device could be implemented by way of hardware, software, firmware, or a combination of these, operable to implement the dynamic modification of the flow of information. It will be appreciated that the computing device possesses significant processing power to implement the aforesaid method. Examples of the computing device include, but are not limited to, laptop computers, desktop computers, tablet computers, personal digital assistants.

Optionally, the computing device is configured to operate autonomously. Alternatively, optionally, the computing device is configured to operate semi-autonomously. In such an instance, an authorized person could manage operation of the computing device, to ensure that the computing device implements the aforesaid method. In an example, the authorized person could control the computing device, for example, by way of pressing a button of the computing device, to collect the feedback related to the presented first and second sets of information. Upon the press of the button by the authorized person, the computing device would collect the aforesaid feedback.

Furthermore, optionally, the computing device is further configured to create a first set of clusters, wherein a cluster in the first set of clusters includes members of the first group that have a common associated information flow type; and associate the common associated information flow type to the cluster.

Optionally, the computing device is further configured to affiliate members of a second group to clusters of the first set of clusters, wherein a member of the second group is affiliated with a cluster of the first set of clusters based on a profile of the members of the second group, wherein the members of the second group are associated with a plurality of second devices that are communicably coupled to the computing device; and associate the information flow type associated with the clusters of the first set of clusters with the members of the second group affiliated thereto.

Moreover, optionally, the computing device is further configured to present a second set of information to the members of the second group using the information flow type associated therewith.

Optionally, the computing device is further configured to collect feedback related to the presented second set of information from the members of the second group; determine fit scores for the members of the second group based upon the collected feedback; associate the members of the second group with an information type selected from the plurality of different information flow types corresponding to the determined fit scores of the members; and re-affiliate at least one member of the second group to a cluster of the first set of clusters based upon the information flow type associated with the determined fit score of the at least one member of the second group.

DETAILED DESCRIPTION OF THE DRAWINGS

Figure 1:
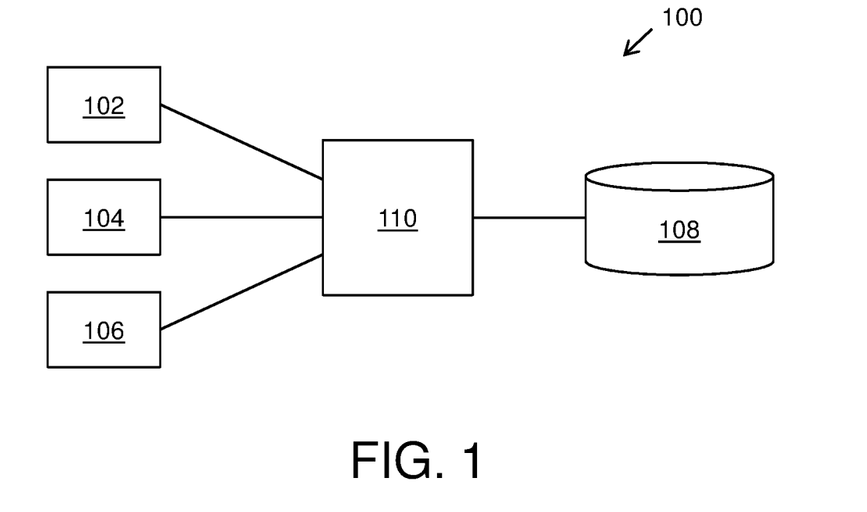
FIGS. 1 and 2 are schematic illustrations of systems for dynamically modifying a flow of information, in accordance with different embodiments of the present disclosure.

Referring to FIG. 1, illustrated is a schematic illustration of a system 100 for dynamically modifying a flow of information, in accordance with an embodiment of the present disclosure. The system 100 comprises a plurality of first devices (depicted as devices 102, 104 and 106) associated with members of a first group, a database 108 configured to store at least a first set of information, and a computing device 110 communicably coupled to the plurality of first devices 102-106 and the database 108. Furthermore, the computing device 110 is configured to present the first set of information to the members of the first group, wherein a member is presented the first set of information using an initial information flow type selected from a plurality of different information flow types; collect feedback related to the presented first set of information from the members; determine fit scores of the members of the first group based upon the collected feedback; and associate the members of the first group with an information flow type selected from the plurality of different information flow types, corresponding to the determined fit scores of the members.

Figure 2:
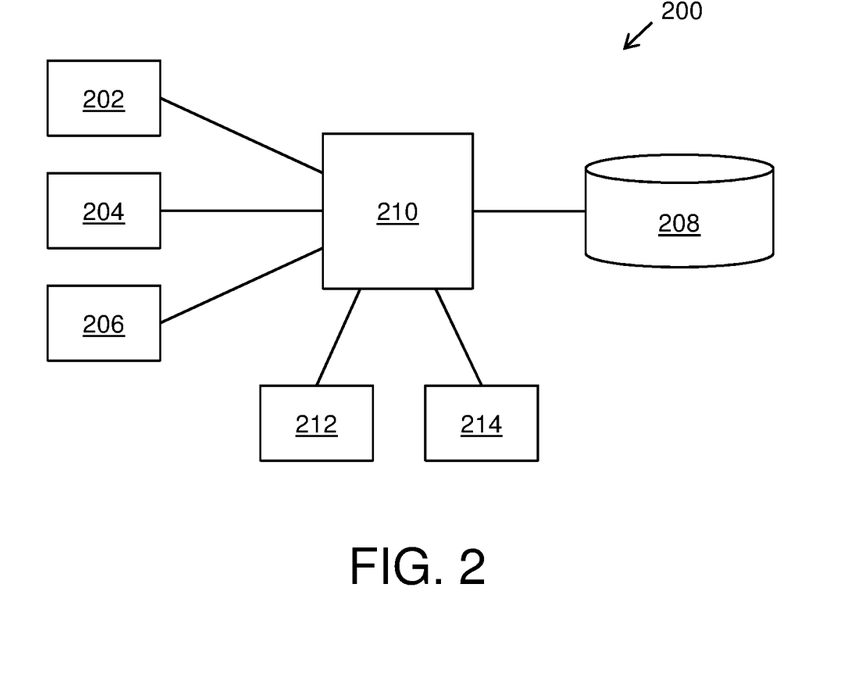

Referring to FIG. 2, illustrated is a schematic illustration of a system 200 for dynamically modifying a flow of information, in accordance with another embodiment of the present disclosure. The system 200 comprises a plurality of first devices (depicted as devices 202, 204 and 206) associated with members of a first group, a database 208 configured to store at least a first set of information, and a computing device 210 communicably coupled to the plurality of first devices 202-206 and the database 208. The system 200 further comprises a plurality of second devices (depicted as devices 212 and 214) associated with members of a second group. As shown the plurality of second devices 212-214 are communicably coupled to the computing device 210. Furthermore, the computing device 210 is configured to present the first set of information to the members of the first group using a plurality of different information flow types, collect feedback related to the presented first set of information, from the members of the first group, determine a fit score for each member of the first group, based upon the collected feedback, and associate the each member of the first group with an information flow type among the plurality of different information flow types, based upon the determined fit score corresponding to the each member.

Figure 3:
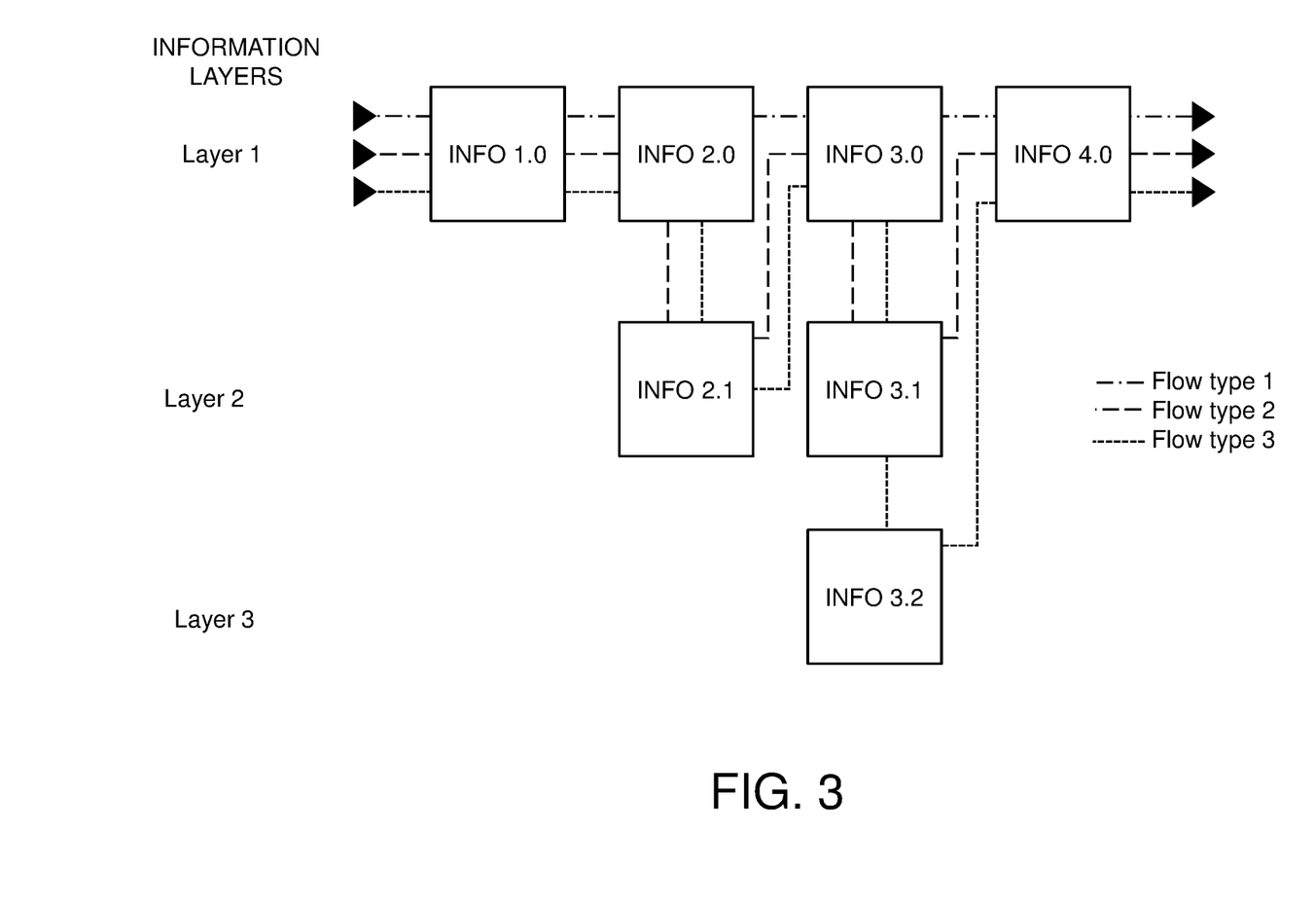
FIG. 3 is an illustration of an exemplary first set of information, in accordance with an embodiment of the present disclosure.

Referring to FIG. 3, illustrated is an exemplary first set of information, in accordance with an embodiment of the present disclosure. As shown, the first set of information is optionally arranged as a plurality of information blocks, depicted as information blocks INFO 1.0, INFO 2.0, INFO 3.0, INFO 4.0, INFO 2.1, INFO 3.1, and INFO 3.2. Moreover, optionally, the plurality of information blocks are further arranged as at least one information layer, depicted as information layers 'Layer 1', 'Layer 2', and 'Layer 3'. As shown, the Layer 1 comprises information blocks INFO 1.0, INFO 2.0, INFO 3.0, and INFO 4.0, the Layer 2 comprises information blocks INFO 2.1 and INFO 3.1, and the Layer 3 comprises information block INFO 3.2.

Furthermore, the first set of information is presented to members of a first group using an information flow type among a plurality of different information flow types, depicted as Flow type 1, Flow type 2, and Flow type 3). In an example, the first set of information could be presented using the Flow type 1. In such a case, only the information blocks of the Layer 1 are presented to the aforesaid members. In another example, the first set of information could be presented using the Flow type 2. In such a case, the information blocks of the Layer 1 and the Layer 2 are presented to the aforesaid members. Therefore, it will be appreciated that presenting the first set of information using the Flow type 2 provides more information blocks (namely, more information content) to the members of the first group. Furthermore, it will be appreciated that use of the Flow type 3 provides the most information blocks (namely, most information content) among the depicted plurality of different information flow types.

Figure 4:
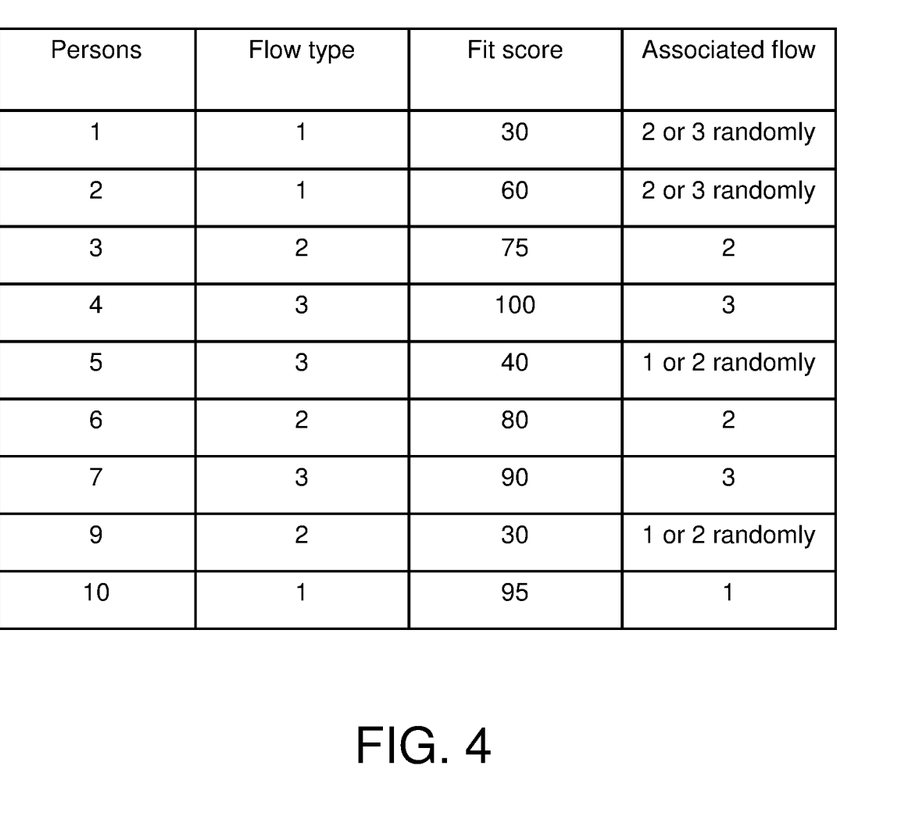
FIG. 4 is an exemplary tabular representation describing a plurality of different information flow types to be employed for presenting the exemplary first set of information to members of a first group, determined fit scores for the members of the first group, and information flow types associated with the members of the first group, in accordance with an embodiment of the present disclosure.

Referring to FIG. 4, illustrated is an exemplary tabular representation describing a plurality of different information flow types to be employed for presenting the exemplary first set of information to members of a first group, determined fit scores for the members of the first group, and information flow types associated with the members of the first group, in accordance with an embodiment of the present disclosure. In the given table, a first column depicts members of a first group, a second column depicts a plurality of different information flow types (for example, such as the Flow types 1, 2 and 3 as shown in FIG. 3) to be used for presenting a first set of information to the members of the first group. Furthermore, a third column of the table depicts fit scores determined for each member of the first group based upon a collected feedback related to the presented first set of information. Moreover, a fourth column of the table depicts information flow types associated with the each member of the first group, based upon the determined fit scores corresponding to the each member.

In an example, person 5 is initially presented the first set of information using the Flow type 3. Thereafter, feedback pertaining to the presented first set of information is collected from the person 5, and based upon such feedback, a fit score for the person 5 is determined to be 40 out of a possible 100. Therefore, such a fit score is below a pre-determined threshold level (for example, such as 70 out of 100). Consequently, any of the Flow types 1 or 2 is randomly associated with the person 5. In another example, person 7 is also initially presented the first set of information using the Flow type 3. Thereafter, feedback pertaining to the presented first set of information is collected from the person 7, and based upon such feedback, a fit score for the person 7 is determined to be 90 out of the possible 100. Therefore, such a fit score is above the pre-determined threshold level. Consequently, the Flow type 3 is associated with the person 7.

Figure 5:
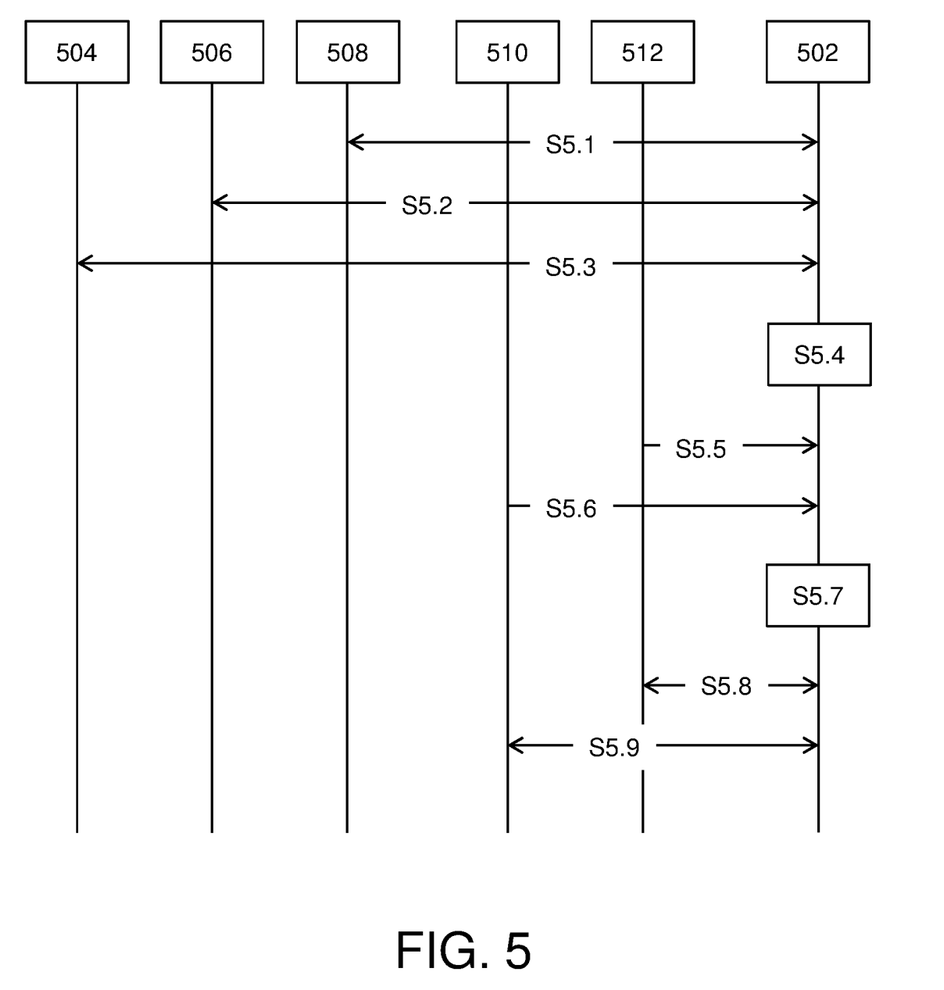
FIG. 5 is an exemplary sequence diagram of implementation of a system (for example, such as the system of FIG. 2), in accordance with an embodiment of the present disclosure.

Referring to FIG. 5, illustrated is an exemplary sequence diagram of implementation of a system (for example, such as the system 200 of FIG. 2), in accordance with an embodiment of the present disclosure. At step S5.1, S5.2 and S5.3, a computing device 502 presents a first set of information to members of a first group (depicted as persons 504, 506, and 508) using a plurality of different information flow types, and collects feedback related to the presented first set of information from the members of the first group 504-508. Thereafter, the computing device 502 determines a fit score for each member of the first group 504-508, based upon the collected feedback; and associates the each member of the first group 504-508 with an information flow type among the plurality of different information flow types, based upon the determined fit score corresponding to the each member. At step S5.4, the computing device 502 clusters the members of the first group 504-508 based upon the associated information flow types, to create a first set of clusters; and associates an information flow type with each cluster in the first set of clusters. At step S5.5 and S5.6, members of a second group (depicted as persons 510 and 512) provide their corresponding profiles to the computing device 502. At step S5.7, the computing device 502 affiliates members of a second group 510-512 to clusters of the first set of first clusters based on their corresponding profiles; and associates the information flow type associated with the clusters of the first set of clusters, with the members of the second group 510-512 affiliated thereto. At step S5.8 and S5.9, the computing device 502 presents a second set of information to the members of the second group 510-512 using the information flow type associated therewith.

Figure 6:
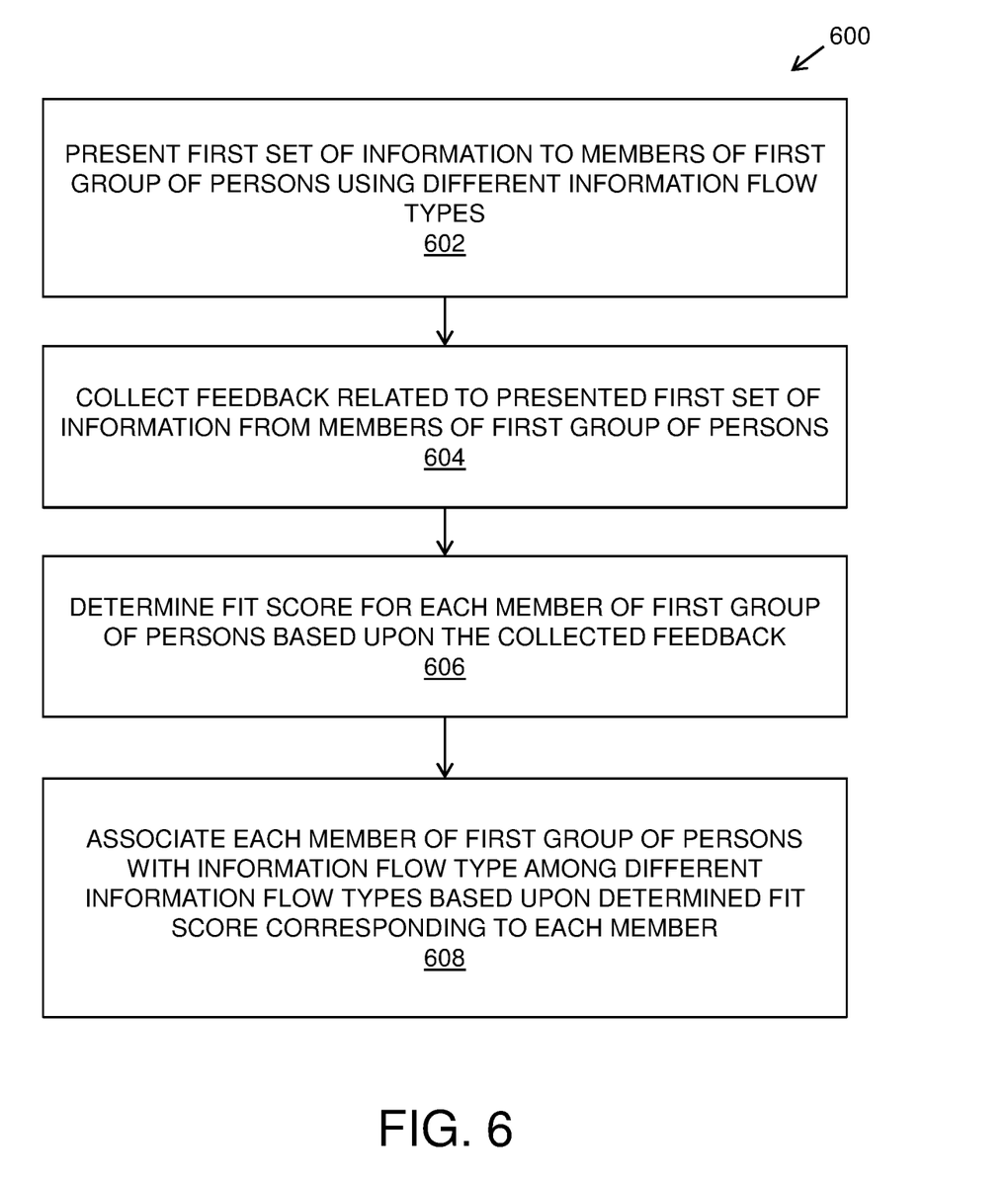
FIG. 6 is an illustration of steps of a method for dynamically modifying a flow of information, in accordance with an embodiment of the present disclosure.

Referring to FIG. 6, illustrated are steps of a method 600 for dynamically modifying a flow of information, in accordance with an embodiment of the present disclosure. At step 602, a first set of information is presented to members of a first group, wherein a member is presented the first set of information using an initial information flow type selected from a plurality of different information flow types. At step 604, a feedback related to the presented first set of information is collected from the members. At step 606, fit scores for the members of the first group are determined, based upon the collected feedback. At step 608, the members of the first group are associated with information flow types selected from the plurality of different information flow types corresponding to the determined fit scores of the members.

The steps 602 to 608 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A method for dynamically modifying a flow of information, via a system comprising a plurality of first devices associated with members of a first group, a database, and a computing device, the method being implemented by the computing device, the method comprising:

presenting a first set of information to the members of a first group, wherein a member is presented the first set of information using an initial information flow type selected from a plurality of different information flow types;

collecting feedback related to the presented first set of information from the members, the feedback comprising sensor data associated with the members of the first group and including at least one of timestamps associated with the inputs of the members of the first group or audio captured by the members of the first group;

determining fit scores for the members based upon the collected feedback, wherein the fit scores are deter-

19 mined by comparing expected feedback from the members of the first group with the collected feedback from the members of the first group; and associating the members with information flow types selected from the plurality of different information flow types corresponding to the determined fit scores of the members, wherein the member of the first group is associated with the initial information flow type used for presenting the first set of information to the member if the determined fit score for the member is above a pre-determined threshold level.

2. A method according to claim 1, wherein the method further comprises:

creating a first set of clusters, wherein a cluster in the first set of clusters includes members of the first group that have a common associated information flow type; and associating the common associated information flow type to the cluster.

3. A method according to claim 2, wherein the method further comprises:

affiliating members of a second group to clusters of the first set of clusters, wherein a member of the second group is affiliated with a cluster of the first set of clusters based on a profile of the member of the second group; and associating the information flow type associated with the clusters of the first set of clusters with the members of the second group affiliated thereto.

4. A method according to claim 3, wherein the method further comprises:

presenting a second set of information to the members of the second group using the information flow type associated therewith.

5. A method according to claim 4, wherein the method further comprises:

collecting feedback related to the presented second set of information from the members of the second group;

determining fit scores for the members of the second group based upon the collected feedback;

associating the members of the second group with an information type selected from the plurality of different information flow types corresponding to the determined fit scores of the members; and re-affiliating at least one member of the second group to a cluster of the first set of clusters based upon the information flow type associated with the determined fit score of the at least one member of the second group to create a second set of clusters.

6. A method according to claim 1, wherein the initial information flow types are selected based upon at least one of:

a nature of one or more of the first set of information and the second set of information;

profiles of the members of the first group;

preferences of the members of the first group;

random selection;

probabilistic selection.

7. A method according to claim 1, wherein the feedback is collected during one or more of presenting the first set of information and after presenting the first set of information.

8. A method according to claim 1, wherein the feedback is collected by way of at least one of:

obtaining ratings from the members of the first group;

obtaining sensor data associated with the members of the first group.

9. A method according to claim 1, wherein the sensor data further includes at least one of:

20 inputs of the members of the first group;

one or more of image and video captured by the members of the first group.

10. A method according to claim 1, further comprising that the member of the first group is associated with an information flow type different from the initial information flow type used for presenting the first set of information to the member if the determined fit score for the member is below the pre-determined threshold level.

11. A method according to claim 1, wherein one or more of the first set of information and the second set of information is arranged as a plurality of information blocks, and wherein the plurality of information blocks are further arranged as at least one information layer.

12. A system for dynamically modifying a flow of information, the system comprising:

a plurality of first devices associated with members of a first group;

a database configured to store at least a first set of information; and a computing device communicably coupled to the plurality of first devices and the database, wherein the computing device is configured to:

present the first set of information to the members of the first group, wherein a member is presented the first set of information using an initial information flow type selected from a plurality of different information flow types;

collect feedback related to the presented first set of information from the members, the feedback comprising sensor data associated with the members of the first group and including at least one of timestamps associated with the inputs of the members of the first group or audio captured by the members of the first group;

determine fit scores for the members of the first group based upon the collected feedback, wherein the fit score are determined by comparing expected feedback from the members of the first group with the collected feedback from the members of the first group; and associate the members of the first group with an information flow type selected from the plurality of different information flow types, corresponding to the determined fit scores of the members wherein the member of the first group is associated with the initial information flow type used for presenting the first set of information to the member if the determined fit score for the member is above a pre-determined threshold level.

13. A system according to claim 12, wherein the computing device is further configured to:

create a first set of clusters, wherein a cluster in the first set of clusters includes members of the first group that have a common associated information flow type; and associate the common associated information flow type to the cluster.

14. A system according to claim 13, wherein the computing device is further configured to:

affiliate members of a second group to clusters of the first set of clusters, wherein a member of the second group is affiliated with a cluster of the first set of clusters based on a profile of the member of the second group, wherein the members of the second group are associated with a plurality of second devices that are communicably coupled to the computing device; and associate the information flow type associated with the clusters of the first set of clusters with the members of the second group of affiliated thereto.

15. A system according to claim 14, wherein the computing device is further configured to:
present a second set of information to the members of the second group using the information flow type associated therewith.

16. A system according to claim 15, wherein the computing device is further configured to:
collect feedback related to the presented second set of information from the members of the second group;
determine fit scores for the members of the second group based upon the collected feedback;
associate the members of the second group with an information type selected from the plurality of different information flow types corresponding to the determined fit scores of the members; and
re-affiliate at least one member of the second group to a cluster of the first set of clusters based upon the information flow type associated with the determined fit score of the at least one member of the second group to create a second set of clusters.

17. A system according to claim 12, wherein the feedback is collected by way of at least one of:
obtaining ratings from the members of the first group;
obtaining sensor data associated with the members of the first group.

18. A system according to claim 12, further comprising that
the member of the first group is associated with an information flow type different from the information flow type used for presenting the first set of information to the member if the determined fit score for the member is below the pre-determined threshold level.

* * * * *